United States Patent [19]

Peterson et al.

[11] 4,282,835
[45] Aug. 11, 1981

[54] INTERNAL COMBUSTION ENGINE WITH GAS SYNTHESIZER

[75] Inventors: William D. Peterson, Salt Lake City, Utah; John M. Lytle, Richland, Wash.

[73] Assignee: Wm. D. Peterson & Associates, Salt Lake City, Utah

[21] Appl. No.: 53,750

[22] Filed: Jul. 2, 1979

[51] Int. Cl.³ .................... B01J 7/00; F01N 3/15; F02B 43/08; B01J 8/02
[52] U.S. Cl. ........................................ 123/1 A; 123/3
[58] Field of Search ..................... 123/1 A, 3

[56] References Cited

U.S. PATENT DOCUMENTS

| | | | |
|---|---|---|---|
| 3,968,775 | 7/1976 | Harpman | 123/3 |
| 3,986,350 | 10/1976 | Schmidt | 123/3 |
| 4,003,343 | 1/1977 | Lae | 123/3 |
| 4,033,133 | 7/1977 | Housemann et al. | 123/3 |
| 4,059,076 | 11/1977 | Kosaka et al. | 123/3 |
| 4,059,415 | 11/1977 | Kosaka et al. | 123/3 |
| 4,064,840 | 12/1977 | Vierling | 123/3 |
| 4,079,703 | 3/1978 | Yamane et al. | 123/3 |
| 4,088,450 | 5/1978 | Kosaka et al. | 123/3 |
| 4,170,200 | 10/1979 | Takeuchi et al. | 123/3 |
| 4,185,595 | 1/1980 | Muhlberg | 123/3 |

*Primary Examiner*—Charles J. Myhre
*Assistant Examiner*—R. A. Nelli
*Attorney, Agent, or Firm*—Robert Finch

[57] ABSTRACT

An internal combustion engine, synthesizing CO and $H_2$ fuels from methanol in a first synthesizer, and also synthesizing $H_2$ fuel from CO and water in a second synthesizer, thus upgrading a technically difficult to use fuel to a low polluting, easily usable fuel, by use of the energy from exhaust gas waste heat thus improving the fuel heating value by 20%; the engine fuel system also having an alternate energy source for synthesizing the fuel, the engine also having an additional alternate fuel source for engine starting and operation when the synthesized fuel reservoir is low and electrical battery energy is limited thus allowing time for the heat exchanger synthesizers to warm up to produce CO and $H_2$ fuel, which is especially required during cold operating seasons.

1 Claim, 1 Drawing Figure

INTERNAL COMBUSTION ENGINE WITH GAS SYNTHESIZER

BACKGROUND OF THE INVENTION

Methanol, commonly known as wood alcohol, is easily manufactured from municipal or forest wastes, coal or petroleum. In some respects methanol has been considered as a possible alternate fuel to gasoline. Like gasoline it is a liquid. There exists the technology to produce methanol from a variety of sources including coal. Methanol, however, suffers problems of poor cold weather starting, causing corrosion to engine parts and low heating value. These problems are related to methanol's similarity to water. For instance, methanol has a high heat of vaporization of 184 calories per gram. This acts to cool the intake manifold rapidly thus causing methanol to remain a liquid into the combustion chamber. By comparison, gasoline's heat of vaporization is about 80 calories per gram. Gasoline also has some very volatile (light ends) components which are easily vaporized to provide easy cool weather starting. Like water, methanol also catalyzes some corrosion reactions especially when small amounts of water are present. The heating value of methanol is less than one half of that of gasoline. This means that automobile tankage and external storage facilities would have to be more than doubled in size to be on par with present standards. Mixing methanol with gasoline to increase automobile fuel supplies has been considered. However, methanol's low solubility in gasoline especially in the presence of a small amount of water is of vital concern, and the fuel mixture becomes corrosive when methanol is added.

At approximately 500° C. in the presence of a nickel (Ni) catalyst on aluminum oxide ($Al_2O_3$) methanol ($CH_3OH$) rapidly disassociates to carbon monoxide (CO) and hydrogen ($H_2$). The equilibrium for this reaction is greater than 97% toward synthesis gas at the 500° C. temperature and one MPa (10 atm). The heating value of the fuel is now increased from methanol at 4802 cal/g (8644 Btu/lb) to the synthesis gas (CO and $H_2$) at 5693 cal/g (10,24 Btu/lb.). This is 119% of the original heating value. In essence, waste heat from the exhaust gas is used to increase the energy content of the fuel and thus increase the overall engine efficiency.

In a secondary synthesis at around the same temperature but in the presence of an iron (Fe) catalyst on $Al_2O_3$ the CO and water ($H_2O$) shift to $CO_2$ and $H_2$. The heating value has little change, however, an improvement in pollution control results when the fuel is burned in the engine. This is due to the lower burning temperature because of the heat capacity added by the $CO_2$ being carried into the engine which must be heated in combustion. The equilibrium for nitrous oxide formation is less at the lower combustion temperatures.

The source of heat for heating the methanol and water is the waste heat in exhaust gases. This consists of around 35% of the fuels energy. Approximately 55% of the exhaust gas' available heat is the amount required to heat the fuel for the synthesis. The hot synthesis gas heats the entering methanol and water to exchange heat which cools the synthesis gas for storage before consumption.

The engine fuel system to the combustion chamber is typically a gas fuel system such as a propane type. An alternate fuel source may be provided which typically is propane. Air typically 21% oxygen and 79% nitrogen is pumped from the ambient atmosphere to provide the oxidizer. Water may be pumped in from the water tank to reduce the combustion temperature to minimize the nitrous oxide pollutants generated.

Advantages have been claimed for the use of hydrogen in an internal combustion engine. These advantages are a low lean limit and high specific heat which lead to higher compression ratios, greater efficiency and possibly less pollution. These advantages are increased with high pressure injection into the engine. There is, however, a great disadvantage, that is, the fuel is gaseous at ambient conditions. The use of synthesis gas as a fuel will have some of the same advantages as hydrogen with the additional advantage that its source is a liquid fuel. This means that conventional automobile tankage and dispensaries may be utilized.

Greater efficiency may be attained from two sources by converting $CH_3OH$ or other fuels to synthesis gas and using this as the engine fuel: 1. energy is added to the fuel from the sensible heat of the exhaust gases and 2. the synthesis gas itself may be burned more efficiently. Other advantages include the possibility of using non-conventional fuel sources such as fuel oil or pulverized coal to produce the synthesis gas for the internal combustion engine.

BRIEF SUMMARY OF THE INVENTION

The invention is a methanol or wood alcohol fueled internal combustion engine. The engine also uses water and synthesizes hydrogen and carbon monoxide fuels from the original fuel before consuming the fuel to generate work.

BRIEF DESCRIPTION OF THE DRAWING

The drawing shows a typical system of the invented engine and the fuel intake systems and oxidizer air system to the intake valve and the exhaust system from the exhaust valve. The exhaust line has a routing through the fuel intake system to use the exhaust gas waste heat to synthesize the fuel to increase the fuel heating value and thus the overall engine efficiency. The engine also has an alternate energy source for synthesizing the fuel. The engine also has an additional alternate fuel source for engine starting and operating when the synthesized fuel reservoir is low and electrical battery energy is limited. This allows time for the heat exchanger synthesizer to warm up and produce. This is especially beneficial during cold operating seasons.

DETAILED DESCRIPTION

Figure 1:
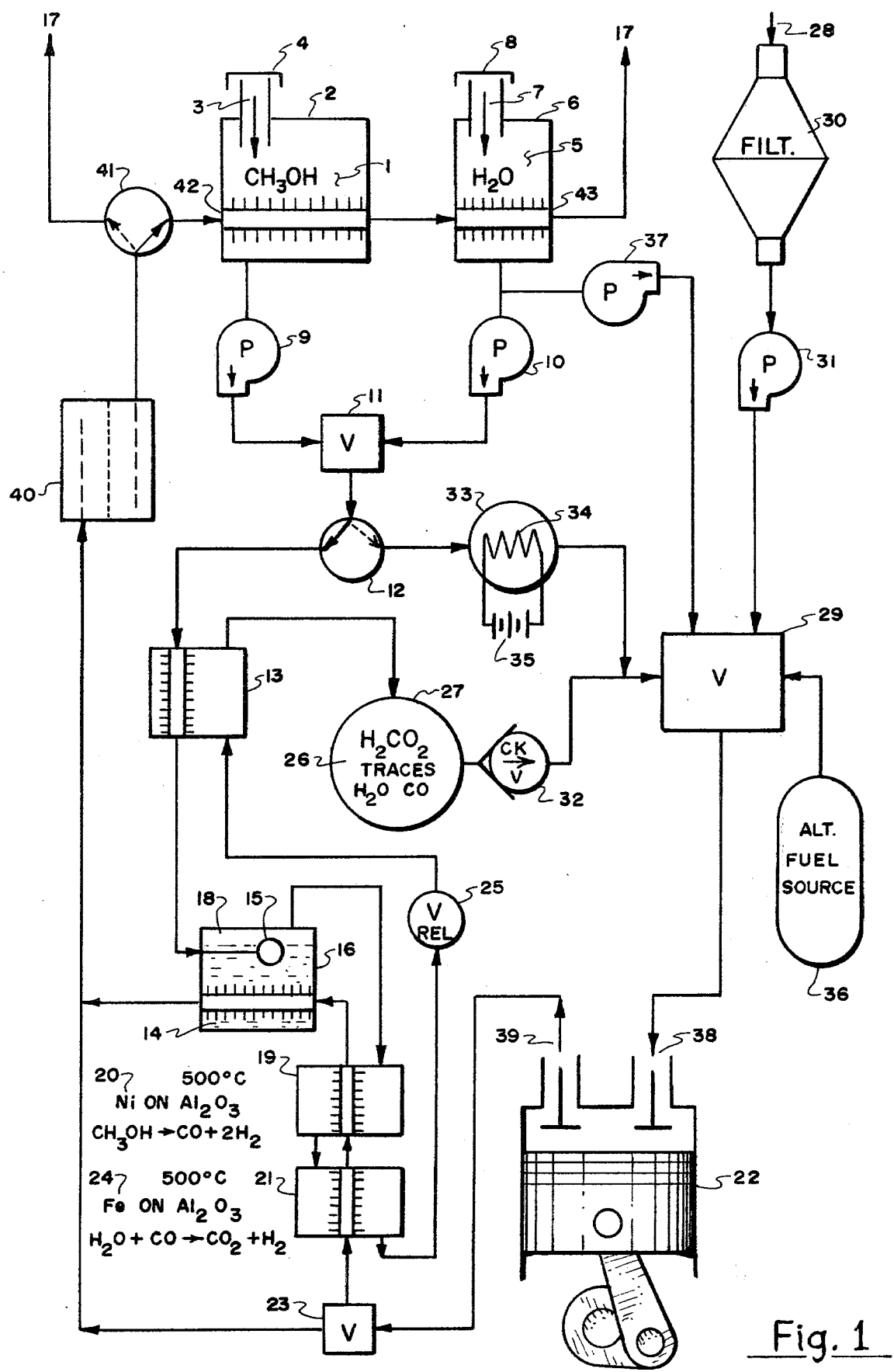

Methanol 1, or wood alcohol is confined in a fuel tank 2, as a liquid which is put into the tank 2, through filler 3, and closed by a cap 4. Likewise, water 5, is confined in a water tank 6, having a water filler 7, and a cap 8. A fuel pump 9, and water pump 10, pump fuel 1, and water 5, to a mixing valve 11. The fuel 1, and water 5, are routed by a 3-way valve 12, to the synthesized fuel cool heat exchanger 13, where the liquid fuel 1, water 5, have their first normal heating. The liquid fuel and water along with some gas vapor from the fuel 1, as it may be, proceeds to the liquid 14, float 15, heat exchanger 16, where the engine exhaust gases 17, heat the fuel 1, and water 5, to a gas 18. The gas 18, now being above the liquid 14, can now proceed to the first exhaust gas heated synthesizer 19, heat exchanger containing a Ni on $Al_2O_3$ catalyst 20, which is heated to around 500° C. by the engine exhaust gases 17, where the $CH_3OH$ disassociates to CO plus $2H_2$. The fuel 1 with water 5, vapor then proceeds to the second exhaust gas heated synthesizer 21, heat exchanger which is heated by exhaust gases 17, coming directly from the engine 22, via the exhaust switch valve 23. The second synthesizer 21, contains a Fe on $Al_2O_3$ catalyst 24, where at temperatures above 500° C. $H_2O$ and CO disassociate to $CO_2$ plus $H_2$. Ideally, the fuel is now $H_2$ with $CO_2$ which is nonreactive with traces of $H_2O$ and CO. This material now proceeds to a pressure drop valve 25, then on to the fuel cool heat exchanger 13, where the fuel 1, and water 5, have their initial heating and the synthesized fuel 26, is cooled and routed to the synthesized fuel accumulator 27, prepared for mixing with air 28, at the mix valve 29, and fed to the engine 22. The air 28, comes thru the filter 30, as pumped by the air pump 31. A check valve 32, separates the synthesized fuel accumulator 27, and the mix valve 29. Fuel 26, also accumulates in a heated liquid/vapor fuel accumulator 33, which connects between the check valve 32, and mix valve 29.

After the engine 22, has been off, synthesized fuel 26, is available from the synthesized fuel accumulator 27, and the liquid/vapor fuel accumulator 33. The liquid float heat exchanger 16, must be up to temperature to produce vaporized methanol 1, for the engine to prepare fuel for itself. Should the engine run out of synthesized fuel 26, before basic fuel 1, can be prepared by vaporizing, a heater 34, operated by electric power 35, such as a battery can boil methanol 1, routed to the heated liquid/vapor fuel accumulator 33, by the 3-way valve 12, and confined by the check valve 32, to maintain the pressure to keep the fuel 1, from accumulating back into the synthesized fuel accumulator 27, and on back into the heat exchangers. Another source of starting and also operating fuel is an alternate fuel source 36, which could be a gas or low pressure and temperature vaporizing fuel such as propane which can be mixed with air 28, at the mix valve 29, and used as a fuel as in conventional propane consuming engine systems.

Hydrogen from the synthesized fuel 26, burns hot in an engine 22, and can thus potentially produce excessive nitrous oxide pollutants. To keep the combustion temperature lower, water 5, can be added to the mix valve 29, by way of a water pump 37.

The combustable fuel 26, and air 28, enters the engine 22, through an intake valve 38, and the resulting exhaust gases 17, leave the engine 22, by way of the exhaust valve 39, and proceed to the exhaust switch valve 23. The exhaust gases 17, can be switched to the fuel synthesizing heat exchangers 21, 19, and the fuel 1, vaporizing heat exchanger 16, or if their temperatures are sufficiently hot the exhaust gases 17, can be switched around these heat exchangers 21, 19, 16, in either case on to a muffler then on to a 3-way exhaust valve 41 where the exhaust gases 17, can either be exhausted into the atmosphere or can be further routed through a fuel tank heat exchanger 42, and a water tank heat exchanger 43, where the fuel 1, and water 5, can be initially heated in very cold conditions and possibly kept from freezing in some instances.

We claim:

1. In combination, an internal combustion engine, a source of fuel comprising a mixture of Methonol and water, for supply to a pair of synthesizers serially connected and accepting exhaust gas from said engine, the first of said synthesizers first receiving exhaust gases containing a catalyst of iron on $Al_2O_3$ and the second one of said synthesizers containing a catalyst of Nickel on $Al_2O_3$, a first heat exchanger accepting engine exhaust gases discharged from said second synthesizer and arranged to accept said fuel mixture; means for conducting said fuel mixture from said first heat exchanger to said synthesizers to pass sequentially through said second and first synthesizers thence to said engine for combustion therein; and a second heat exchanger located between said internal combustion engine and the discharge from said first synthesizer for the passage therethrough of gas discharged from said synthesizers prior to supply to said engine, and means conducting said fuel mixture through said second heat exchanger prior to the supply of said mixture to said first heat exchanger.

* * * * *